Oct. 13, 1925.

F. P. ZIMMERLI 1,557,517

VISCOSIMETER

Filed July 30, 1923

Inventor
F. P. Zimmerli
By Semmes & Semmes
his Attorneys

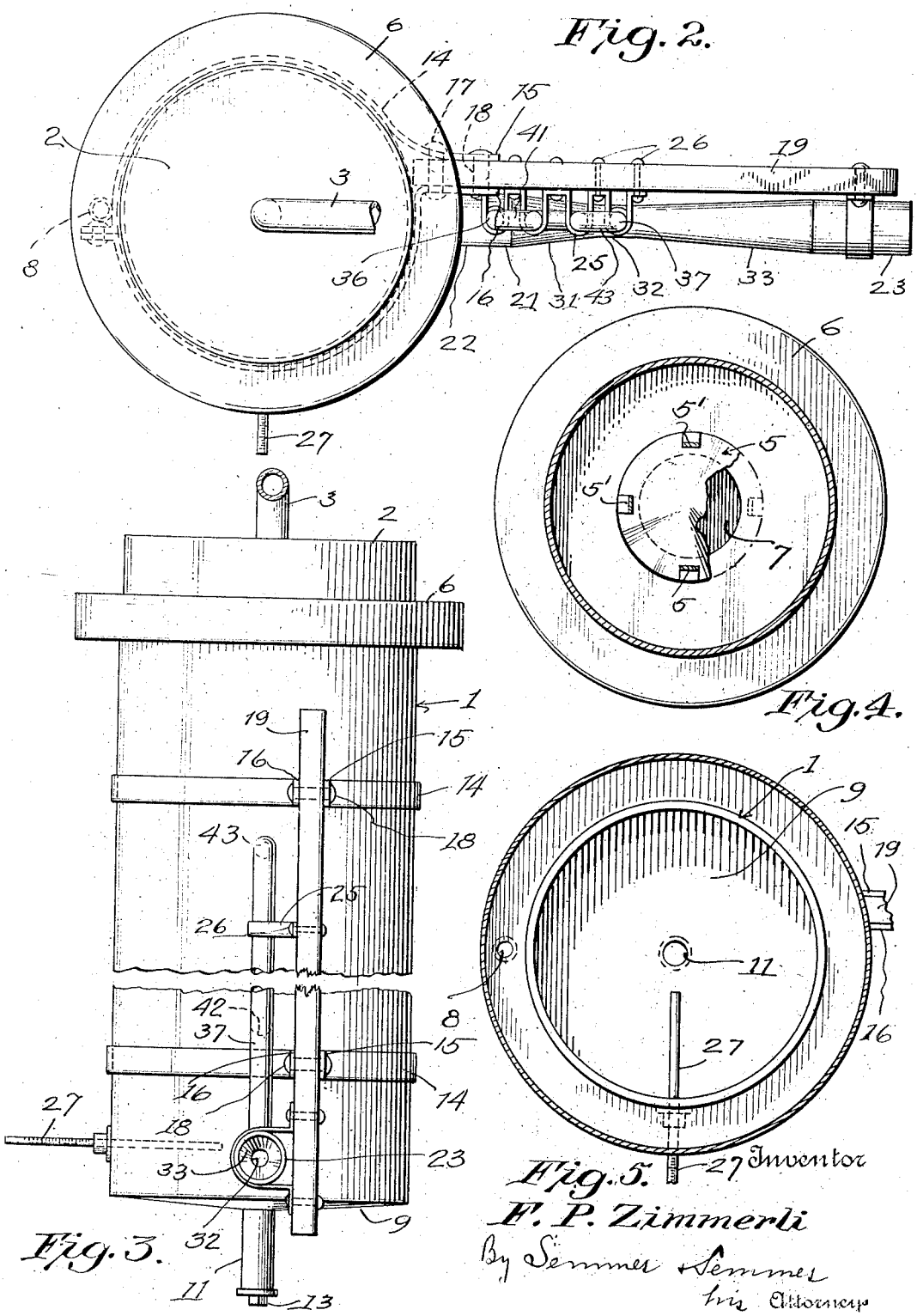

Patented Oct. 13, 1925.

1,557,517

UNITED STATES PATENT OFFICE.

FRANZ P. ZIMMERLI, OF DETROIT, MICHIGAN.

VISCOSIMETER.

Application filed July 30, 1923. Serial No. 654,673.

*To all whom it may concern:*

Be it known that I, FRANZ P. ZIMMERLI, a citizen of the United States, residing at Detroit, in the county of Wayne and State of Michigan, have invented certain new and useful Improvements in Viscosimeters, of which the following is a specification.

This invention relates to certain new and useful improvements in testing apparatus, and more particularly to mechanism for indicating the thickness or thinness of liquids containing matter in solution, or of solutions whose composition is free of suspended substances or whose body consists of heavy slow moving particles such as possess great vicosity.

Heretofore meters for measuring the viscosity of fluids have been what might be termed laboratory meters, that is to say, meters which give samples of the material undergoing test. The device which I have invented is what might be termed a continuous viscosimeter, that is to say, the liquid in its process of manufacture may be continuously run into my machine at one end and out at the other end during the entire run with the absolute certainty that measurement for viscosity is for the entire period.

The viscosity meter illustrated is mounted upon a board intended to be hung or otherwise suspended upon the wall, and is particularly adaptable to determining the viscosity of oils, enamels, greases, etc., and one of the objects of my invention is to provide a device in which the introduction of the liquid into the mouth thereof may be made with as little disturbance as possible. In order to accomplish this, I provide a series of baffle plates so that after the container or beaker is partially filled with the liquid to be measured or tested, the continuous flow or velocity of the input will produce no effect upon the reading of the scale.

Another object of my invention is to provide means for this thermometric reading of the viscous flow of liquids such as varnish, enamels, lubricating oils, etc., so that these may be compared with others at the same or different temperatures.

With these and other objects in view, which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which for the purpose of explanation, have been made the subject of illustration.

In the drawings:

Fig. 2 is a plan view thereof;

Fig. 3 is an end view looking from the right side of my device;

Fig. 4 is a sectional view on the line 4—4 of Fig. 1; and

Fig. 5 is a sectional view on the line 5—5 of Fig. 1.

Similar reference characters indicate the same or corresponding parts throughout the several figures of the drawings.

Figure 1:
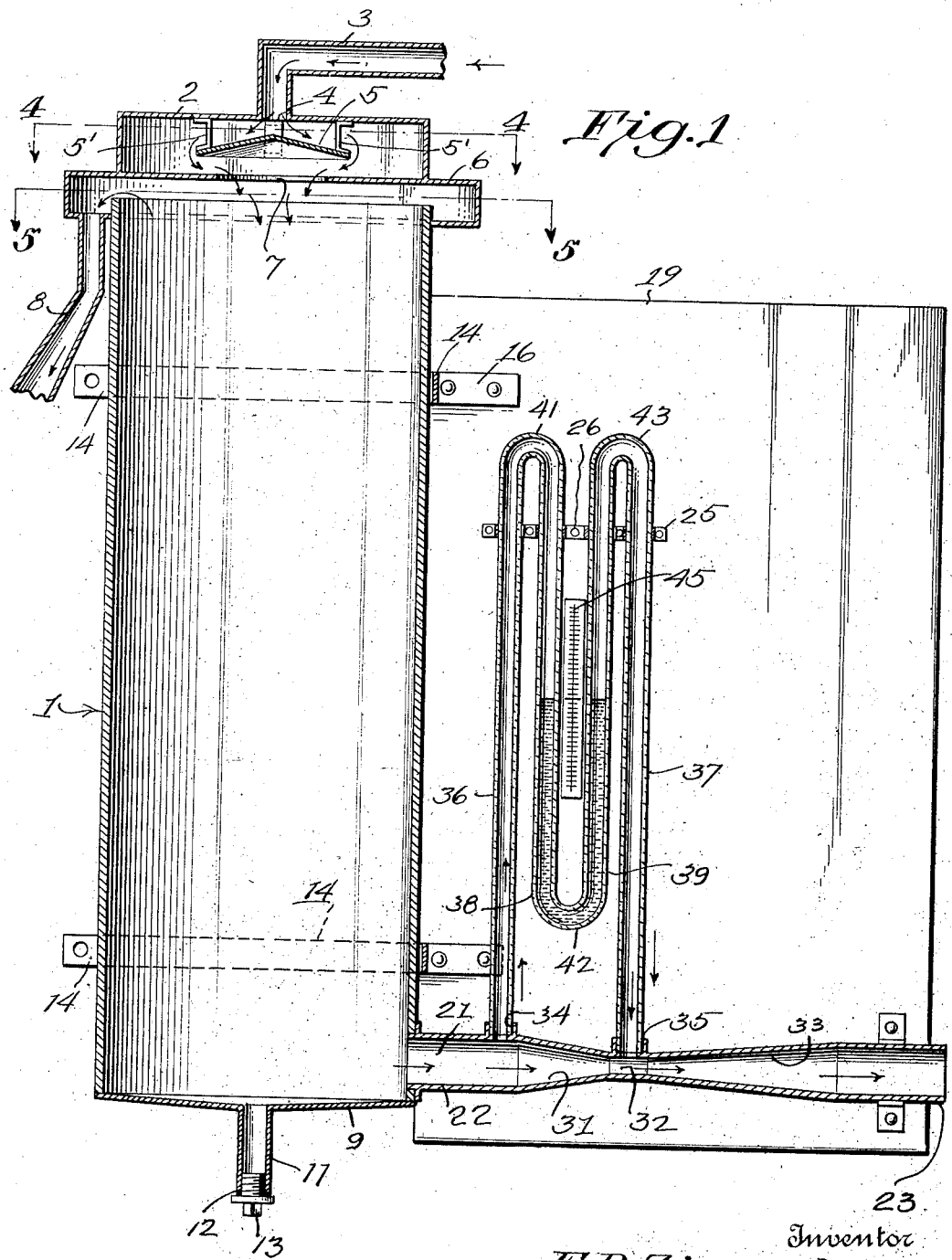
Figure 1 is a vertical sectional view of my improved device complete.

The numeral 1 indicates a container or beaker, preferably of steel or other suitable material, in the upper portion or antechamber 2 of which is inserted an inlet pipe 3 in an opening 4, through which the liquid enters said antechamber, whence it descends upon the circular baffle plate 5 attached to the lower side of said antechamber 2 by means of depending plates 5' attached thereto. The cover 6 of the container proper is provided at its center 7 with an annular opening of a size somewhat smaller than the baffle plate 5 through which the liquid is conveyed into the container 1, and on the left hand side is provided with an overflow pipe 8 so as to hold the head of the material constant. The lower portion or bottom 9 of the container is provided with a short drain pipe 11, screw-threaded at its lower end, into which fits a correspondingly screw-threaded block 13, upon the removal of which the remaining liquid therein is emptied so that the container may be cleansed.

As clearly seen in Figures 1 and 2, the container is surrounded by semi-circular bands 14 bolted together on the far side and embracing on its near side between its ends 15 and 16, by means of bolts 17 and 18, a mounting board 19 to which the device is attached.

In filling the container with the material to be tested, it is brought into the container through the inlet pipe 3, any excess thereof discharging itself through the overflow 8, the remainder flowing through the measuring tube 21. This tube 21 is of the same size at 22 and at 23, which latter is supported by a bracket bolted to the mounting board. The U-tube and connections, as seen in Fig. 2, are held in place upon the board by the brackets 25 and clamping bolts 26. As seen in Figures 3 and 4, the device is provided with a thermometer 27, by means of which thermometric readings may be obtained when the material is heated.

The tube 21 is of the same size at 22 and 23, but the intermediate portion 31, 32, 33, as seen in Figure 1, is considerably restricted, especially at the throat 32. The outlet pipe 21 is provided on its upper side with outlets 34 and 35 into which are fitted the respective ends of a pipe having outer legs 36 and 37 and inner legs 38 and 39, with goose necks 41, 42 and 43, the whole being united into a continuous pipe, and between the inner legs is located a gauge divided into desired calibrated units (such as Saybolt records for oil or MacMichael units for enamels).

The operation of the device is as follows: The material to be tested is fed into the inlet pipe 3 at such a rate that the container 1 is filled with a slight excess overflowing through the outlet pipe 8. The remainder of the liquid flows through the measuring pipe 21. The U-tube is filled with water or other liquid, preferably colored, to the center of the calibrated scale to be presently described. Due to the construction of said pipe at the throat 32, a partial vacuum is formed in the outer leg or ascending tube 37, and a pressure in the outer leg or ascending tube 36 on the other side, which is communicated through the goose necks at 41 and 43 respectively to the U-tube and the liquid therein, and the change is noted upon the calibrated scale at 45.

As thicker materials are placed in the container, the velocity through the measuring pipe is, of course, diminished with less action at the throat and less disturbance of the measuring fluid. With thinner liquids, the reverse is true. To meet this condition, should the material be very thick or very thin, measuring tubes with various sized throats may be employed, but for continuous work on definite material, such is not necessary.

Further, by providing means for ascertaining the heat of the liquid, the lubricating qualities thereof may be compared at different temperatures and also the lubricating qualities of different liquids may be compared at the same temperature.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:—

1. In a viscosimeter, the combination with a container adapted to contain a substance of undetermined viscosity, an inlet pipe in the top thereof, baffle plates against which the incoming liquid is diverted as it enters the container, and an overflow outlet near the top of the container for the discharge of the excess or fluid undergoing test, of an outlet pipe narrowed at the throat extending laterally from the bottom of the container, a U-tube adjacent thereto, with a measuring liquid therein, means connecting the U-tube with the outlet tube, whereby a vacuum is produced in one leg of the U-tube and a pressure in the other leg thereof, and a calibrated scale for registering the differences in the levels of the measuring fluid in the respective branches of the U-tube.

2. In a viscosimeter, the combination with a container adapted to contain a fluid of undetermined viscosity, an inlet pipe, baffle plates against which the incoming fluid is diverted as it enters the container, and an overflow outlet near the top of the container for the discharge of the excess of said fluid undergoing test, of an outlet pipe narrowed at its throat extending laterally therefrom near the bottom of the container, a U-tube adjacent thereto with a measuring liquid therein, means connecting the U-tube with the outlet pipe whereby a vacuum is produced in one leg of the U-tube and a pressure in the other leg thereof, and a calibrated scale for registering the differences in the levels of the measuring liquid in the respective branches of the U-tube.

3. In a viscosimeter, the combination with a container adapted to contain a fluid of undetermined viscosity, an inlet pipe, baffle plates against which the incoming fluid is diverted as it enters the container, and an overflow outlet for the discharge of the excess of said fluid undergoing test, of an outlet pipe, a U-tube adjacent thereto with a measuring liquid therein, means connecting the U-tube with the outlet pipe whereby a vacuum is produced in one leg of the U-tube and a pressure in the other leg thereof, and a calibrated scale for registering the differences in the levels of the measuring liquid in the presssure measuring device.

4. In a continuous viscosimeter, the combination with a container adapted to contain a fluid of undetermined viscosity, an inlet pipe, baffle plates against which the incoming fluid is diverted as it enters the container, and an overflow outlet for the discharge of the excess of said fluid undergoing test, of an outlet pipe narrowed at its throat, a U-tube adjacent thereto with a measuring liquid therein, means connecting the U-tube with the outlet pipe whereby a vacuum is produced in one leg of the U-tube, and a pressure in the other leg thereof, and a calibrated scale for registering the differences in the levels of the measuring liquid in the respective branches of the U-tube.

5. In a viscosimeter, the combination with a container adapted to contain a fluid of undetermined viscosity, an inlet pipe, baffle plates against which the incoming fluid is diverted as it enters the container, and an overflow outlet for the discharge of the excess of said fluid undergoing test, of an outlet pipe narrowed at its throat, a U-tube adjacent thereto with a measuring liquid therein, means connecting each member of the U-tube with the outlet pipe, whereby a vacuum is produced in one leg of the U-tube and a pressure in the other leg thereof, and a scale for registering the differences in the measuring liquid in the respective branches of the U-tube.

6. In a viscosimeter, the combination with a container adapted to contain a fluid of undetermined viscosity, an inlet pipe, baffle plates against which the incoming fluid is diverted as it enters the container, an overflow outlet for the discharge of any excess of said fluid undergoing test, and a thermometer to measure the temperature of said fluid, of an outlet pipe narrowed at the throat, a U-tube adjacent thereto with a measuring liquid therein, means connecting each member of the U-tube with the outlet pipe whereby a vacuum is produced in one leg of the U-tube and a pressure in the other leg thereof, and a scale for registering the differences in the measuring liquid in the respective branches of the U-tube.

7. In a viscosimeter, the combination with a container adapted to contain a fluid of undetermined viscosity, an inlet pipe and an overflow pipe, of an outlet pipe connected with the container and having a restricted area through which the material undergoing test is required to pass, and a pressure gauge connected to the outlet pipe near the point of restricted area whereby the viscosity of the passing material is registered in desired units on the pressure gauge.

8. In a viscosimeter, the combination with a container adapted to contain a fluid of undetermined viscosity, an inlet pipe and an overflow pipe, of an outlet pipe connected with the container having a restricted area through which the material undergoing test is required to pass, and a pressure gauge connected to the outlet pipe near the point of restricted area whereby the viscosity of the passing material is continuously registered in desired units on the pressure gauge.

9. In a viscosimeter, the combination with a container adapted to contain a fluid of undetermined viscosity, and means for keeping the liquid under constant pressure, of an outlet pipe connected with the container and having a restricted area through which the material undergoing test is required to pass, and a pressure gauge connected to the outlet pipe near the point of restricted area whereby the viscosity of the passing material is registered in desired units on the pressure gauge.

10. In a viscosimeter, means for producing a steady pressure source of fluid whose viscosity is to be determined, a pipe to be connected with said source having a restricted area through which fluid under test is required to pass, and a pressure gauge connected to the outlet pipe near the point of restricted area, whereby the viscosity of the passing material is continuously registered in desired units on the pressure gauge.

11. In a viscosimeter, means for producing a source of fluid whose viscosity is to be determined, a pipe connected with said source and having a restricted area through which fluid under test is required to pass, means for maintaining a pressure of a certain column height of said fluid in the pipe, and a pressure gauge connected to the pipe near the point of restricted area, whereby the viscosity of the passing material is continuously registered in desired units on the pressure gauge.

12. In a viscosimeter, means for producing a steady pressure source of fluid whose viscosity is to be determined, a pipe connected with said source and having a restricted area through which the fluid under test is required to pass, a U-tube with a measuring liquid therein, one branch of the U-tube being connected adjacent the restricted portion and the other branch at a different position in the pipe, whereby each leg of the U-tube is subjected to different pressure, and a scale co-operating with the measuring liquid in the U-tube to give a continuous viscosity reading.

13. In a viscosimeter, means for producing a source of fluid whose viscosity is to be determined, a pipe connected with said source and having a restricted area through which the fluid under test is required to pass, means for maintaining a pressure of a certain column height of said fluid in the pipe, a U-tube with a measuring liquid therein, one branch of the U-tube being connected adjacent the restricted portion and the other branch at a different position in the pipe, whereby each leg of the U-tube is subjected to different pressure, and a scale co-operating with the measuring liquid in the U-tube to give a continuous viscosity reading.

14. In a viscosimeter, means for producing a steady pressure source of fluid whose viscosity is to be determined, a pipe connected with said source and having a restricted area through which the fluid under test is required to pass, a pressure gauge, one side of the gauge being connected adjacent the restricted portion and the other side at a different position in the pipe, whereby the different sides of the gauge are subjected to different pressures, and a scale-co-operating with the gauge to give a continuous viscosity reading.

In testimony whereof I affix my signature.

FRANZ P. ZIMMERLI.